United States Patent
Murase

(10) Patent No.: US 7,139,393 B1
(45) Date of Patent: Nov. 21, 2006

(54) ENVIRONMENTAL NOISE LEVEL ESTIMATION APPARATUS, A COMMUNICATION APPARATUS, A DATA TERMINAL APPARATUS, AND A METHOD OF ESTIMATING AN ENVIRONMENTAL NOISE LEVEL

(75) Inventor: Atsunobu Murase, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 763 days.

(21) Appl. No.: 09/599,993

(22) Filed: Jun. 23, 2000

(30) Foreign Application Priority Data

Jul. 1, 1999 (JP) ................. 11-187640

(51) Int. Cl.
*H04M 1/00* (2006.01)
(52) U.S. Cl. .................. 379/402; 379/390.01
(58) Field of Classification Search ............... 379/388, 379/392, 406, 390; 381/104, 107
See application file for complete search history.

(56) References Cited

U.S. PATENT DOCUMENTS

| | | | |
|---|---|---|---|
| 4,061,874 A | 12/1977 | Fricke et al. | |
| 4,811,404 A | 3/1989 | Vilmur et al. | |
| 4,829,565 A | 5/1989 | Goldberg | |
| 5,157,653 A * | 10/1992 | Genter | 370/288 |
| 5,187,741 A | 2/1993 | Erving et al. | |
| 5,687,285 A | 11/1997 | Katayanagi et al. | |
| 5,732,390 A * | 3/1998 | Katayanagi et al. | 704/227 |
| 5,771,486 A | 6/1998 | Chan et al. | |
| 5,940,499 A * | 8/1999 | Fujii et al. | 379/388.05 |
| 5,966,438 A * | 10/1999 | Romesburg | 379/388.03 |
| 6,125,288 A | 9/2000 | Imai | |

FOREIGN PATENT DOCUMENTS

| | | |
|---|---|---|
| EP | 0674415 | 9/1995 |
| JP | 9-247247 | 9/1997 |
| KR | 1989-0702356 | 12/1989 |
| KR | 1992-0011292 | 6/1992 |
| WO | WO 9512919 | 5/1995 |
| WO | WO99/05840 | 2/1999 |

OTHER PUBLICATIONS

Ira A. Gerson and Mark A. Jasiuk, Acoustics, Speech, and Signal Processing, 1990. ICASSP-90, 1990 International Conference on Apr. 3-6, 1990 pp. 461-464 vol. 1.*

* cited by examiner

*Primary Examiner*—Sinh Tran
*Assistant Examiner*—Walter F Briney, III
(74) *Attorney, Agent, or Firm*—Louis Woo

(57) ABSTRACT

A level of a sound signal including a voice signal and an environmental noise signal is detected and a level (power level) is sampled in response to a clock signal. It is detected whether the presently sampled level increases from the previously sampled level. An environmental noise level is estimated such that, when the presently sampled level increases from the previously sampled level, difference between the presently and previously estimated environmental noise levels is lower than a predetermined value. When the presently sampled level decreases, the presently estimated environmental noise level is equalized to the presently sampled value. The environmental noise level is estimated only when the detected level is smaller than the predetermined value. The sampling interval may be smaller than 250 msec. Estimation may be stopped in the presence of voice signal. An environmental noise level may be estimated when the detected level is smaller than a reference. A communication apparatus and data terminal including the An environmental noise level estimation apparatus are also disclosed.

24 Claims, 8 Drawing Sheets

ENVIRONMENTAL NOISE LEVEL
ESTIMATION APPARATUS, A
COMMUNICATION APPARATUS, A DATA
TERMINAL APPARATUS, AND A METHOD
OF ESTIMATING AN ENVIRONMENTAL
NOISE LEVEL

BACKGROUND OF THE INVENTION

1. Field of the Invention

This invention relates to an environmental noise level estimation apparatus, a communication apparatus including the same, a data terminal apparatus including the same and a method of estimating an environmental noise level.

2. Description of the Prior Art

An environmental noise level estimation apparatus is known. Japanese patent application provisional publication No. 9-247247 discloses a voice communication equipment. FIG. 8 is a block diagram of this prior art voice compunction apparatus. FIG. 9 is a time chart of the prior art. A microphone 201 receives sound and generates a sound signal which is a/d-converted by an a/d converter 202. The a/d converted sound signal is coded by a coder 203 and modulated by a modulation circuit 204 to transmit the sound signal. A reception signal is demodulated by a demodulator 207 and decoded by a decoder 208. A volume of the decoded signal is controlled by a volume control circuit 209 in accordance with a calculated noise level. An output of the volume control circuit 209 is supplied to a speaker through a d/a converter 210. The output of the a/d converter 202 is also supplied to a noise level calculation circuit 205 to calculate the noise level. A noise level renewing circuit 206 renews the noise level in accordance with an output of the noise level calculation circuit 205.

In this equipment, an amplification level of a voice signal is detected, means values are detected, and a minimum means value is detected from a plurality of means values as a sound noise level by the noise level calculation circuit 205. The mean value is detected every interval t1 and the noise level is renewed every interval t2 including the intervals t1. The volume is controlled in accordance with the noise level by a volume control circuit 209 every interval t2. The noise level is renewed every plurality of intervals for obtaining a plurality of means values.

SUMMARY OF THE INVENTION

The aim of the present invention is to provide a superior environmental noise level estimation apparatus, a superior communication apparatus, and a superior data terminal apparatus.

According to the present invention a first aspect of the present invention provides an environmental noise level estimation apparatus comprising: detection means for detecting a level of a sound signal including a voice signal and an environmental (sound) noise signal; sampling means for repeatedly sampling the level in response to a clock signal; variation detection means, having first storing means, response to the clock signal, for detecting whether the presently sampled level increases from the previously sampled level; and estimation means, having second storing means, responsive to the clock signal, for estimating, renewing, and outputting an environmental noise level of the environmental noise signal such that, when the presently sampled level increases from the previously sampled level, difference between the presently estimated environmental noise level and the previously estimated environmental noise level is lower than a predetermined value to gradually vary the estimated environmental noise level from the previously estimated environmental noise level.

Preferably, the variation detection means further detects whether the presently sampled level decreases from the previously sampled level, when the presently sampled level decreases. The estimation means may estimate the environmental noise level such that the presently estimated environmental noise level corresponds to the presently sampled value to immediately decrease the presently estimated environmental noise level.

Preferably, the detection means comprises power level detection means for detecting a power of the sound signal and outputs the detected power as the level.

Preferably, the environmental noise level estimation apparatus further comprise comparing means for comparing the detected level with a predetermined value, wherein the estimation means estimates the environmental noise level only when the detected level is smaller than the predetermined value.

Preferably, an interval of the clock signal is smaller than 250 msec.

Preferably, the environmental noise level estimation apparatus further comprises voice presence detection means for detecting the presence of voice signal in accordance with an output of the detection means, wherein the environmental noise level detection means stops the estimation means while the voice presence detection means detects the presence of voice signal.

According to the present invention a second aspect of the present invention provides an environmental noise level estimation apparatus comprising: detection means for detecting a level of a sound signal including a voice signal and an environment noise signal; sampling means for repeatedly sampling the level at a first interval; variation detection means, having first storing means, responsive to the sampling means, for detecting whether the presently sampled level increases from the previously sampled level; and estimation means, having second storing means, for estimating and renewing an environmental noise level of the voice signal to output the environmental noise level at a second interval such that, when the presently sampled level increases from the previously sampled level, difference between the presently estimated environmental noise level and the previously estimated environmental noise level is lower than a predetermined value to gradually vary the estimated environmental noise level from the previously estimated environmental noise level, wherein the first interval agrees with the second interval.

According to the present invention a third aspect of the present invention provides a communication apparatus comprising: a microphone for receiving sound and generating a sound signal including a voice signal and an environmental (sound) noise signal; communication means for transmitting the voice signal in a radio wave signal and receiving another voice signal; reproducing means for reproducing the voice signal in accordance with the another voice signal; detection means for detecting a level of the voice signal; sampling means for repeatedly sampling the level in response to a clock signal; variation detection means, having first storing means, for detecting whether the presently sampled level increases from the previously sampled level; and estimation means, having second storing means, responsive to the clock signal, for estimating and renewing an environmental noise level of the voice signal such that, when the presently sampled level increases from the previously sampled level, difference between the presently estimated environmental noise level and the previously estimated environmental noise level is lower than a predetermined value to gradually vary the estimated environmental noise level from the previously estimated environmental noise level; and volume control means for controlling a volume of the reproduced voice signal in accordance with the estimated environmental noise level.

Preferably, the communication apparatus further comprise a codec means for coding voice signal at a predetermined interval to supply the coded voice signal to the communication means as the voice signal and decoding means for decoding the another voice signal at the predetermined interval to supply the decoded another voice signal to the reproducing means as the voice signal, wherein the predetermined interval corresponds to an interval of the clock signal.

Preferably, the interval is 10 msec to 40 msec.

According to the present invention a fourth aspect of the present invention provides a data terminal apparatus comprising: sound source means for supplying sound data; reproducing means for reproducing reproduced sound in accordance with the sound data; a microphone for receiving sound including at least an environmental noise and generating a sound signal; detection means for detecting a level of the sound signal; sampling means for repeatedly sampling the level in response to a clock signal; variation detection means, having first storing means, for detecting whether the presently sampled level increases from the previously sampled level; and estimation means, having second storing means, responsive to the clock signal, for estimating and renewing an environmental noise level of the voice signal such that, when the presently sampled level increases from the previously sampled level, difference between the presently estimated environmental noise level and the previously estimated environmental noise level is lower than a predetermined value to gradually vary the estimated environmental noise level from the previously estimated environmental noise level; and volume control means for controlling a volume of the reproduced voice signal in accordance with the estimated environmental noise level.

According to the present invention a fifth aspect of the present invention provides a method of estimating an environmental noise level comprising the steps of: detecting a level of a sound signal including a voice signal and an environmental noise signal; repeatedly sampling the level in response to a clock signal; detecting whether the presently sampled level increases from the previously sampled level; estimating and renewing an environmental noise level of the voice signal in response to the clock signal to output the environmental noise level such that, when the presently sampled level increases from the previously sampled level, difference between the presently estimated environmental noise level and the previously estimated environmental noise level is lower than a predetermined value to gradually vary the estimated environmental noise level from the previously estimated environmental noise level.

BRIEF DESCRIPTION OF THE DRAWINGS

The object and features of the present invention will become more readily apparent from the following detailed description taken in connection with the accompanying drawings in which.

The same or corresponding elements or parts are designated with like references throughout the drawings.

DETAILED DESCRIPTION OF THE INVENTION

To improve a response in volume controlling, volume control data is renewed at the same time as the sampling timing. Moreover, the volume control data is varied within a predetermined value when the detected level increases from the previous value. On the other hand, if decreases, the volume control data is immediately changed to the value corresponding the detected level.

FIRST EMBODIMENT

Figure 1:
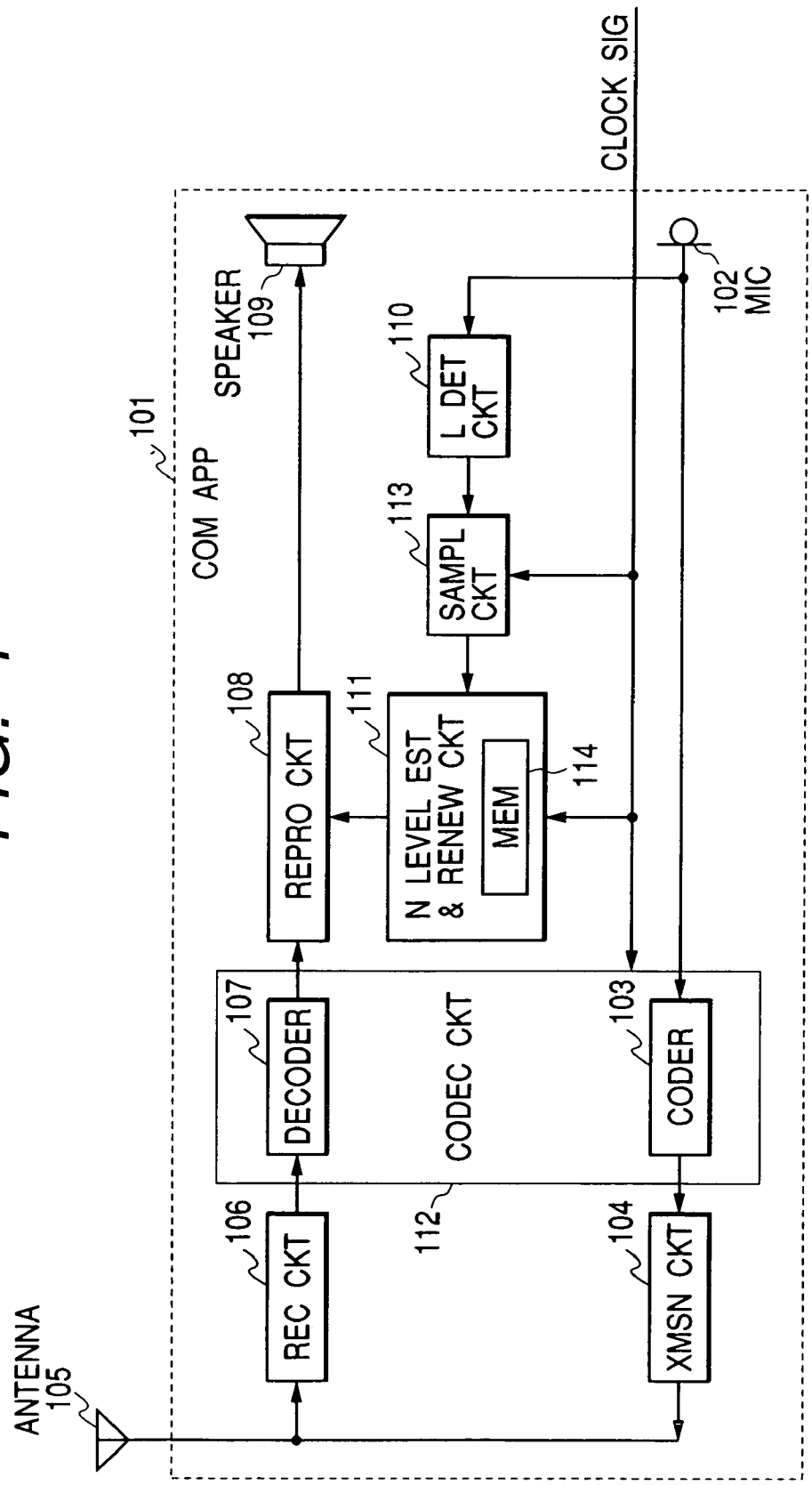
FIG. 1 is a block diagram of a communication apparatus including an environmental noise level estimation apparatus according to a first embodiment of this invention.

FIG. 1 is a block diagram of a communication apparatus including an environmental noise level estimation apparatus according to a first embodiment of this invention.

The communication apparatus 101 such as a cellular phone includes a microphone 102 for receiving sound and generating a sound signal including a voice signal and an environmental (sound) noise signal, a coder 103 for coding the voice signal, a transmission circuit 104 for generating a transmission radio wave signal including the coded voice signal, an antenna 105 for transmitting the transmission radio wave signal and receiving a reception radio wave signal including a reception voice signal, a receiving circuit 106 for receiving the reception radio wave signal, a decoder 107 for decoding the reception voice signal, and a reproducing circuit 108 for reproducing the reception voice signal from the decoder 107 with a gain of the reception voice signal controlled in accordance with estimated noise level signal.

The communication apparatus 101 further includes a level detection circuit 110 for detecting a level of the sound signal from the microphone 102, a sampling circuit 113 for sampling the detected level, and a noise level estimation and renewing circuit 111 for generating the estimated noise level signal in accordance with the sampled level of the sound signal.

The level detection circuit 110, the sampling circuit 113, and the noise level estimation and renewing circuit 111 form an environmental noise level estimation apparatus and the coder 103 and the decoder 107 form a codec circuit 112. The sampling circuit 113, the noise level estimation and renewing circuit 111, and the codec circuit 112 are supplied with the same clock signal to simplifying the circuit structure. However, it is also possible to supply different clock signals to the codec circuit 112 and the noise level estimation and renewing circuit 111.

Sound including a voice and environmental noise inputted to the microphone 102 is converted into a (an electronic) sound signal. The sound signal is supplied to the level detection circuit 110. The level detection circuit 110 detects a level of the sound signal. More specifically, the level detection circuit 110 detects a voltage level of the sound signal, i.e., a sound pressure level of the sound. The level detection circuit 110 may detects a power of the sound signal by accumulating detected sound pressure value for a predetermined interval, for example, a codec frame interval which is generally 20 msec.

The sampling circuit 113 repeatedly samples the level of the sound signal in response to the clock signal and supplies the sampled level to the noise level estimation and renewing circuit 111. The noise level estimation and renewing circuit 111 estimates the sampled level of the sound signal and renews the estimated noise level in response to the clock signal.

The clock signal is determined in accordance with the inherent silent intervals between successive human voice sounds in the voice signal. The relatively short silent interval is smaller than about 250 msec. Therefore, the interval of the clock signal is smaller than 250 msec. it is favorable that the interval of the clock signal is smaller than 200 msec. In this respect, to provide more surely estimation of the environmental noise level, it is further favorable that the interval of the clock signal is smaller than 150 msec.

On the other hand, the sound signal is coded to have coded frame which is generally 20 msec. In this respect, it is favorable that the interval of the clock signal is 10 msec to 40 msec. In this respect, it is further favorably that the interval is 15 msec to 25 msec. In this respect, it is still favorable that the interval is 20 msec because it is general that the codec frame interval is 20 msec.

The noise level estimation and renewing circuit 111 repeatedly estimates the environmental noise level from the sampled level and renews (holds) the estimated environmental noise level in a memory 114 to output the estimated environmental noise level in response to the clock signal.

The noise level estimation and renewing circuit 111 stores the sampled level in response to the clock signal in the memory 114 and compares the presently sampled level with the previously stored sampled level. If the presently sampled level is equal to or decreases from the previously sampled level, the noise level estimation and renewing circuit 111 outputs the presently sampled level or the value corresponding to the presently sampled level. In other words, the presently estimated environmental noise level is equalized to the presently sampled level. If the presently sampled level increases from the previously sampled level, the noise level estimation and renewing circuit 111 adds a predetermined value to the value of the previously (one-clock-signal-prior) sampled level from the memory 114. The addition result represents the estimated environmental noise level because while a human being (the user) is speaking near the microphone 102, there are a sound interval and a silent interval alternately. For the sound interval, the level of the sound signal is mainly determined in accordance with the sound intensity or sound power of the voice of the human being. For the silent interval, the level of the sound signal is mainly determined in accordance with the environmental noise level. The intensity of the voice of the human being is louder than the environmental noise level, because the human being speaks adjacent to the microphone 102, so that comparing the periodically levels with each other provides the estimation of the environmental noise level.

The value added to the previously estimated noise level is considerably smaller than the level of the voice component in the sound signal, for example, 0.1 dB, so that though the sampled level represents the level of the voice, the increased value of the estimated environmental noise level does not largely deviates from the actual value of the environmental noise level. Inversely, the added value is determined in accordance with the possibility of the repeating times of sampling for one voice interval.

On the other hand, if the sample level decreases from the previously sampled level, the decreased level is substituted for the previously estimated level, so that the estimated level simultaneously decreases. Accordingly, the estimated level is prevented from deviation of the actual environmental noise level.

In other words, the estimated noise level smoothly increases while the sampled level represents the level of the voice and the estimated noise level suddenly decreases when the sampled level represents the level of the voice and the presently sampled level is lower than the previously sampled level.

The estimated environmental noise level is held for the following interval of the clock signal and supplied to the reproducing circuit 108. The reproducing circuit 108 including a gain controlled amplifier (not shown), reproduces a reception voice signal received by the antenna 105 with a gain of the reception voice signal controlled in accordance with the estimated environmental noise level, so that if the environmental noise level is high, the reception voice signal is reproduced loudly. Accordingly, the user can surely hear the reception voice generated by the speaker 109.

In the communication apparatus 101, the sound signal from the microphone 102 is supplied to the coder 103 which codes the sound signal. The transmission circuit 104 generates the transmission radio wave signal including the coded voice signal. The antenna 105 transmits the transmission radio wave signal and receives the reception radio wave signal including the reception voice signal. The receiving circuit 106 receives the reception radio wave signal. The decoder 107 decodes the reception voice signal. The reproducing circuit 108 reproduces the reception voice signal from the decoder 107 with a gain of the reception voice signal controlled in accordance with estimated noise level signal as mentioned above.

SECOND EMBODIMENT

Figure 2:
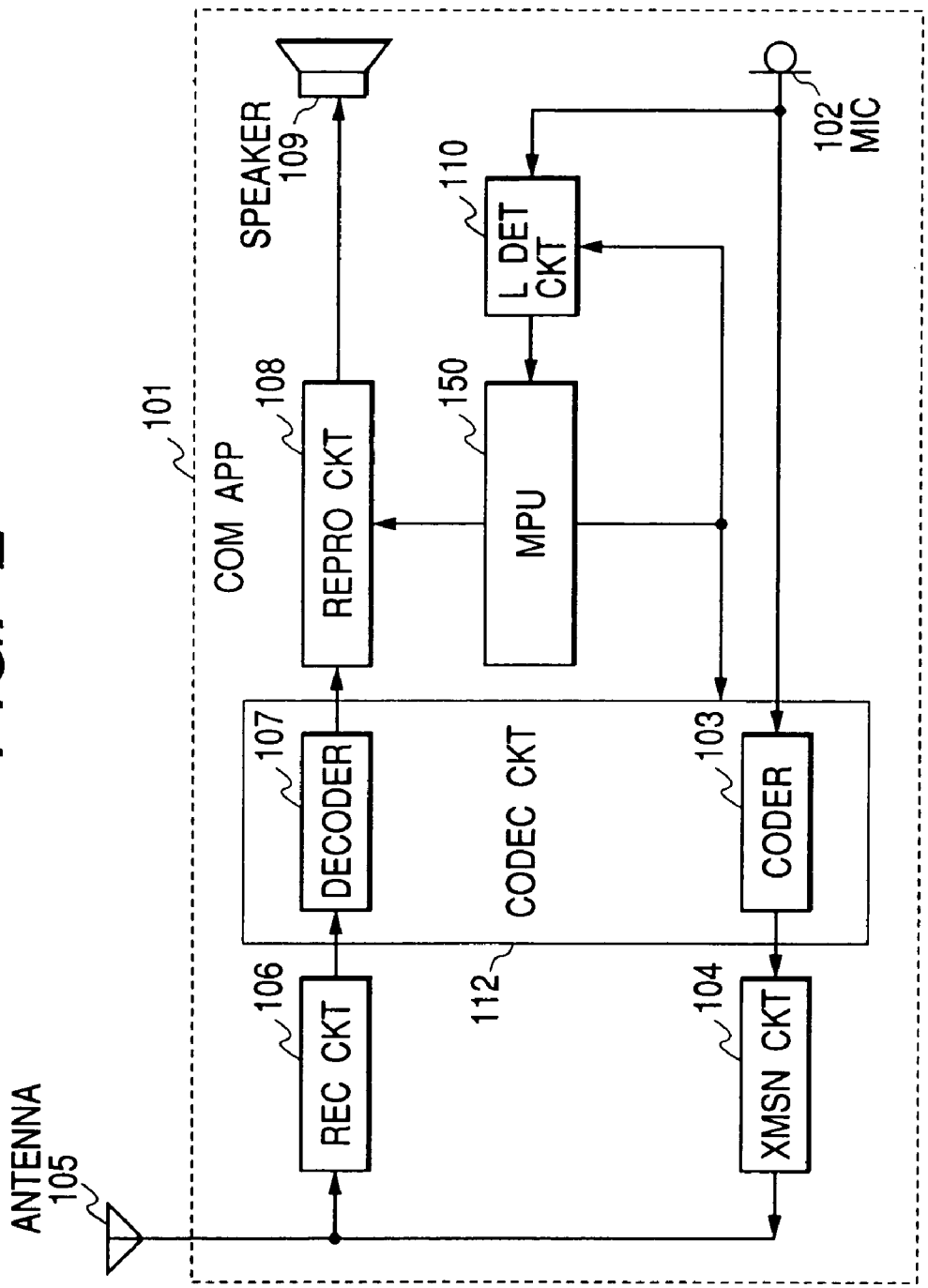
FIG. 2 is a block diagram of a communication apparatus of a second embodiment including a noise level estimation and renewing function.

FIG. 2 is a block diagram of a communication apparatus of a second embodiment including a noise level estimation and renewing function.

The communication apparatus according to the second embodiment has substantially the same structure as that of the first embodiment.

The difference is that a microprocessor 150 replaces the noise level estimation and renewing circuit 111 and the sampling circuit 113.

Figure 3:
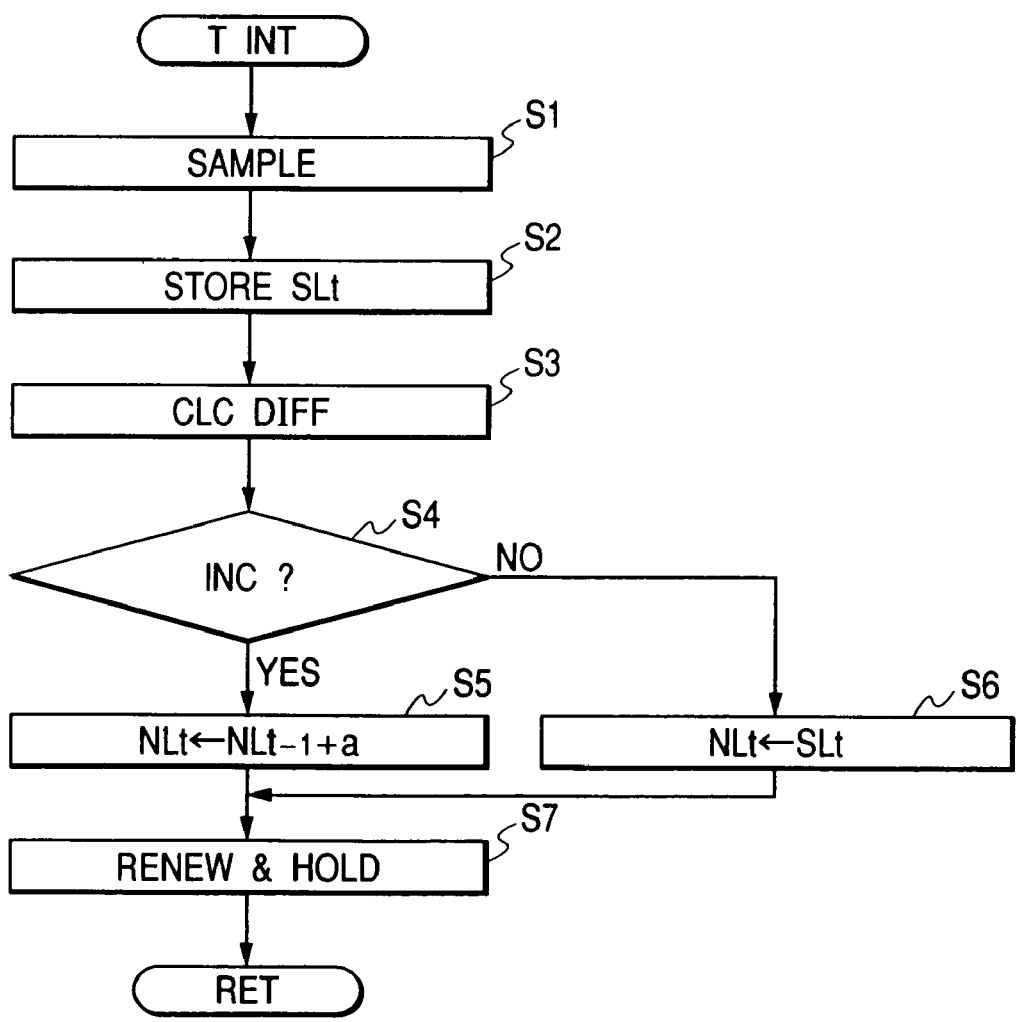
FIG. 3 depicts a flow chart of the second embodiment showing the operation of the microprocessor shown in FIG. 2.

FIG. 3 depicts a flow chart of the second embodiment showing the operation of the microprocessor 150 shown in FIG. 2.

The microprocessor 150 executes a timer interruption at the interval which the same as that of the clock signal shown in FIG. 1.

In step s1, the microprocessor 150 samples the detected level from the level detection circuit 110 and stores the sampled level in step s2. Next, the microprocessor 150 calculates difference between the previously sampled level SLt−1 and the presently sampled level SLt. If the presently sampled level SLt increases from the previously sampled level SLt−1, processing proceeds to step s5 where the microprocessor 150 adds a predetermined value "a" to the previously estimated value NLt−1 to provide presently estimated value NLt. Next, the microprocessor 150 renews the estimated value with the presently estimated environmental noise level NLt and holds the presently estimated value NLt for the following interval before the next timer interruption.

In step s4, if the presently sampled level SLt equal to or decreases from the previously sampled level SLt−1, processing proceeds to step s6 where the microprocessor 150 substitutes the presently sampled level SLt for the presently estimated environmental noise level NLt. That is, the presently estimated environmental noise level NLt is equalized to the presently sampled level SLt. Next, in step s7, the microprocessor 150 renews the estimated value with the presently estimated environmental noise level NLt and holds the presently estimated value NLt for the following interval before the next timer interruption.

THIRD EMBODIMENT

The communication apparatus according to a third embodiment has substantially the same structure as that of the second embodiment.

The difference is that the microprocessor 150 executes a further step s8.

Figure 4:
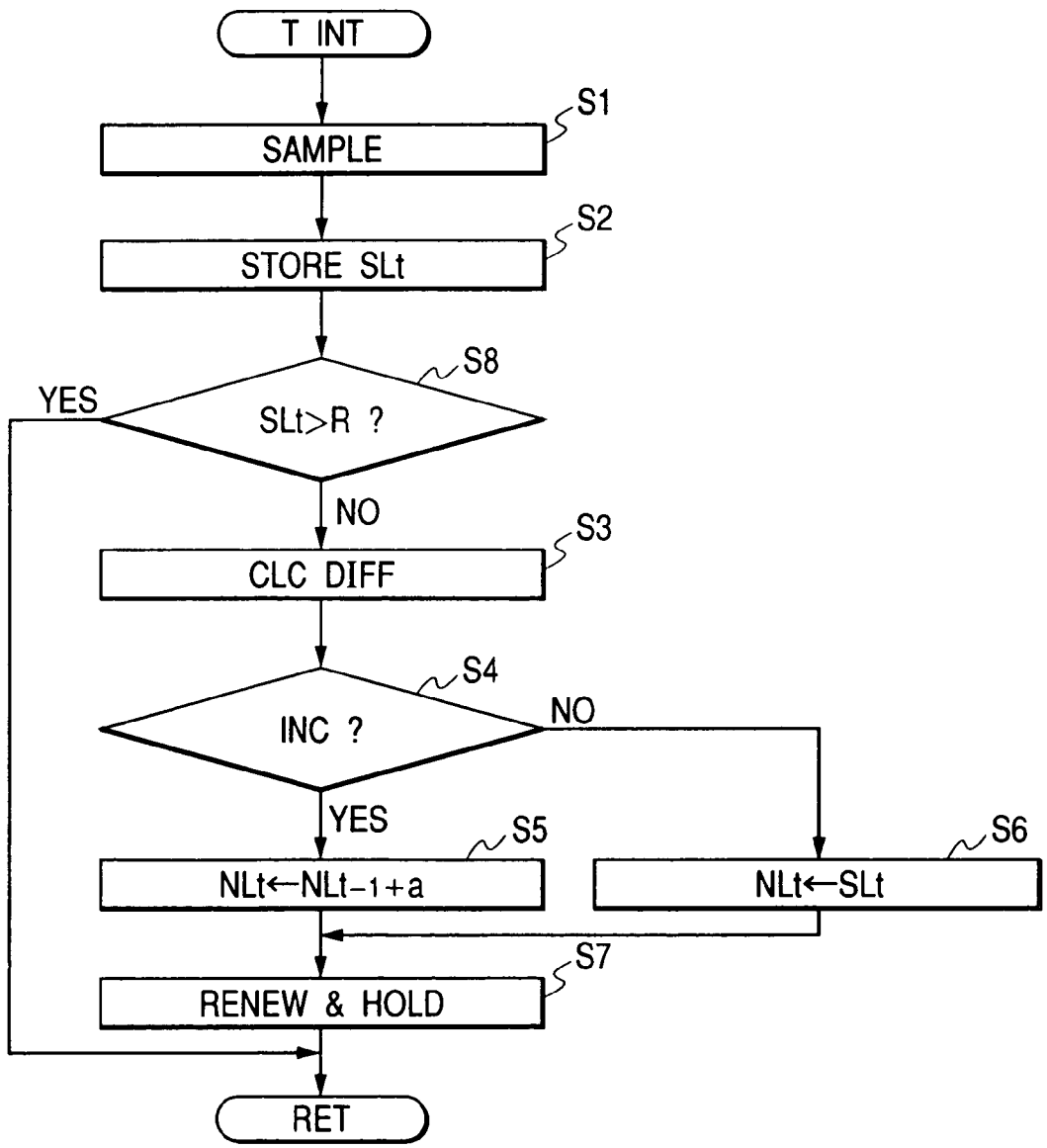
FIG. 4 depicts a flow chart of a third embodiment showing operation of the microprocessor shown in FIG. 2.

FIG. 4 depicts a flow chart of the third embodiment showing the operation of the microprocessor 150 shown in FIG. 2.

After step s2, the microprocessor 150 checks whether the presently sampled level SLt is greater than a reference R in step 8. If the presently sampled level SLt is greater than a reference R, it is Judged that the presently sampled level is derived from a voice by the user. Then, the timer interruption ends and processing returns to the main routine.

If the presently sampled level SLt is not greater than the reference R, it is judged that the presently sampled level is derived from environmental noise. Then, processing proceeds to step s3 to estimate the environmental noise level. The reference R is determined to distinguish the environmental noise level from the voice level by the user.

This additional step s8 provides more surer environmental noise level estimation with excluding the voice level by the user, so that more accurate environmental noise level estimation is provided.

FOURTH EMBODIMENT

Figure 5:
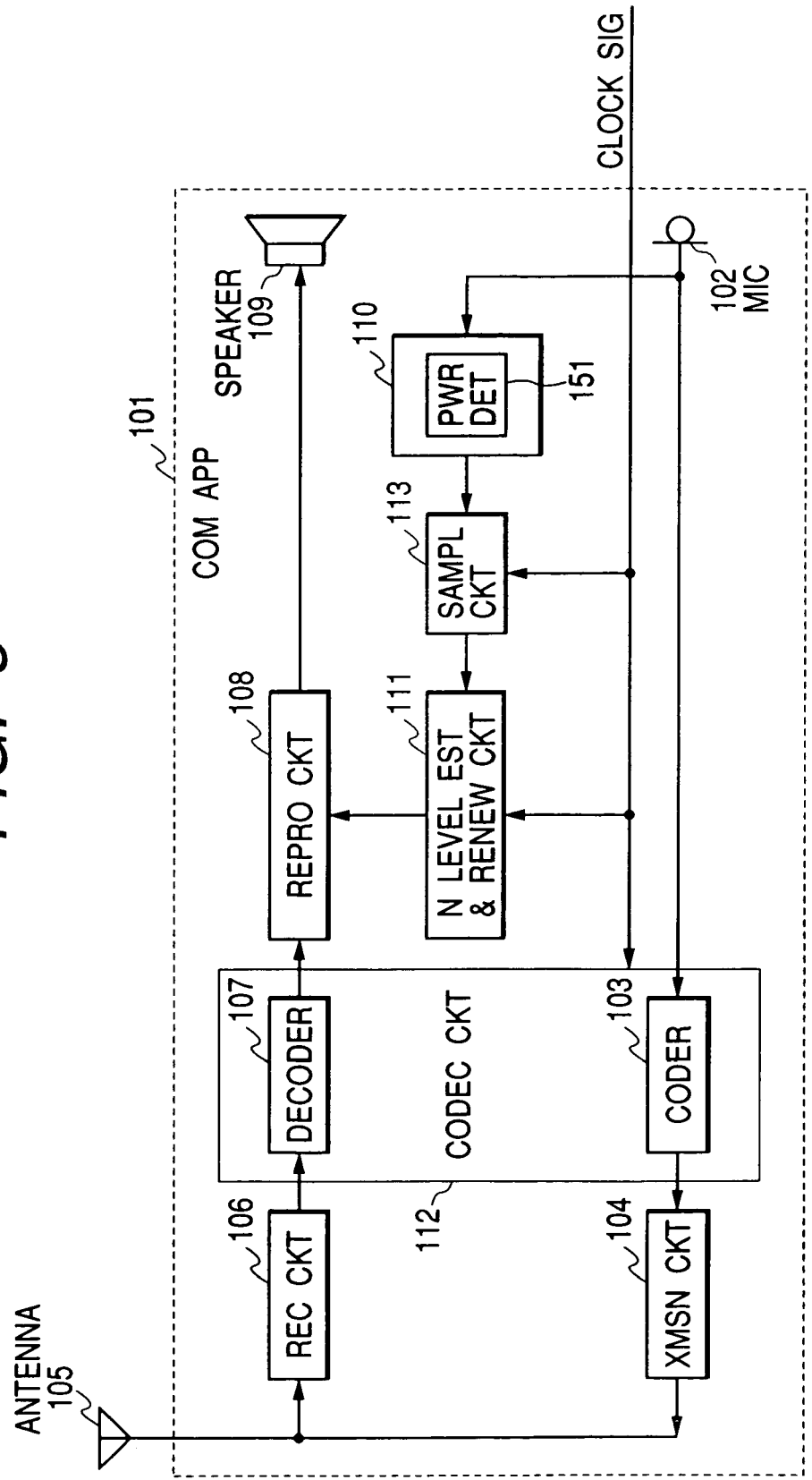
FIG. 5 is a block diagram of a communication apparatus of a fourth embodiment including a noise level estimation and renewing function.

FIG. 5 is a block diagram of a communication apparatus of a fourth embodiment including a noise level estimation and renewing function.

The communication apparatus according to the fourth embodiment has substantially the same structure as that of the first embodiment.

The difference is that the level detection circuit 110 includes a power detection circuit 151. The power detection circuit 151 detects a power of the level of the sound signal from the microphone 102. The noise level estimation and renewing circuit 111 estimates the environmental noise level in accordance with the sampled power level of the sound signal. The power of the sound signal is detected by accumulating detected sound pressure value for a predetermined interval, for example, a codec frame interval which is generally 20 msec.

FIFTH EMBODIMENT

Figure 6:
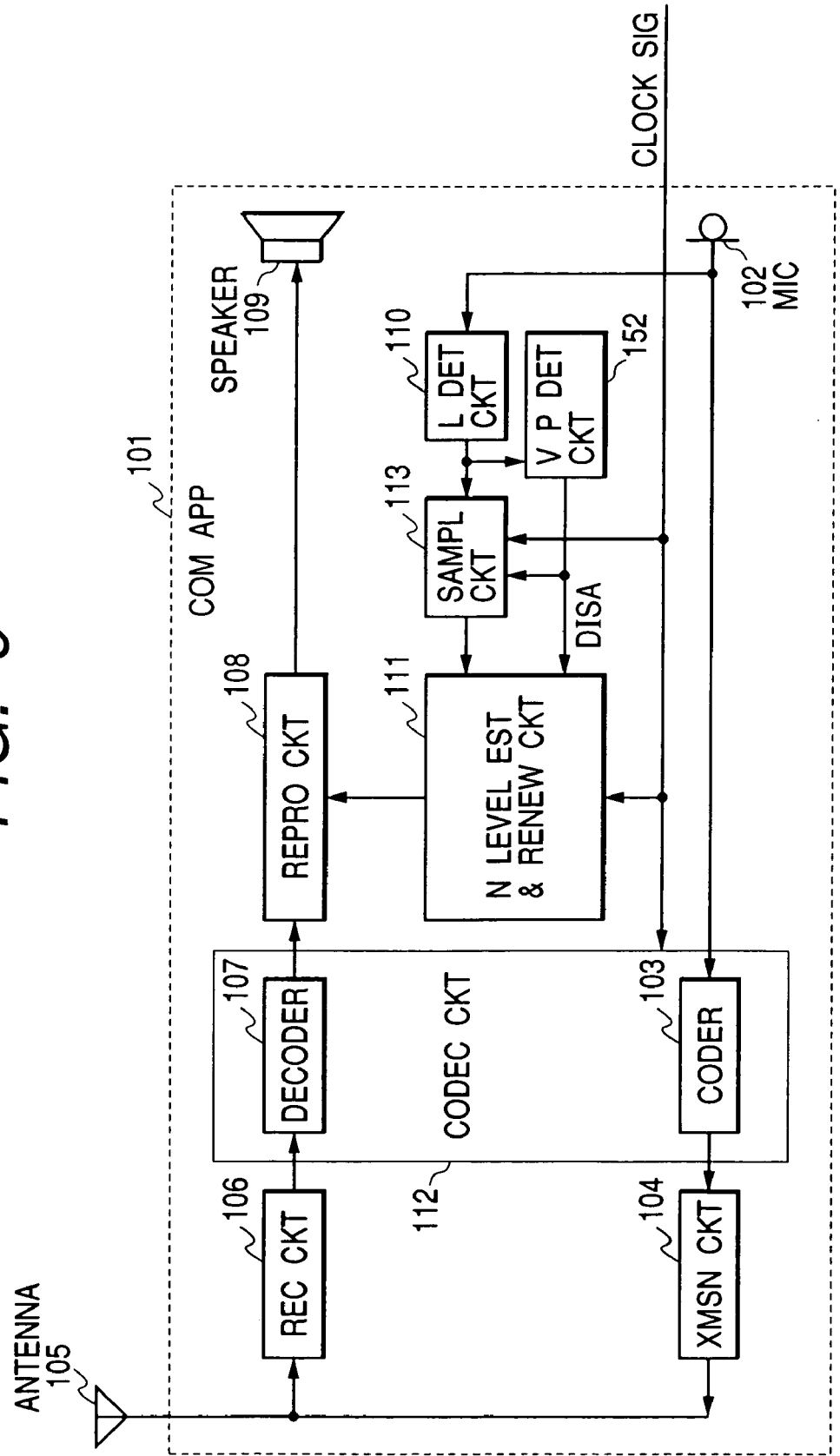
FIG. 6 is a block diagram of a communication apparatus of a fifth embodiment including a noise level estimation and renewing function.

FIG. 6 is a block diagram of a communication apparatus of a fifth embodiment including a noise level estimation and renewing function.

The communication apparatus according to the third embodiment has substantially the same structure as that of the first embodiment.

The difference is that a voice presence detection circuit 152 is further provided.

The voice presence detection circuit 152 detects the presence of voice in the sound signal from the output of the level detection circuit 110. In the presence of voice in the sound signal the voice presence detection circuit 152 generates a disable signal supplied to the sampling circuit and the noise level estimation and renewing circuit 111.

If there is the disable signal, the sampling circuit 113 stops sampling and the noise level estimation and renewing circuit 111 does not effect estimation and renewing in response to the present clock signal. That is, the environmental noise level estimation and renewing circuit 111 estimates and renews the environmental noise level only while the disable signal is not outputted.

Accordingly, the noise level estimation is not supplied with the sampled level derived from the voice of the user, so that the environmental noise level estimation can be accurately effected.

SIXTH EMBODIMENT

Figure 7:
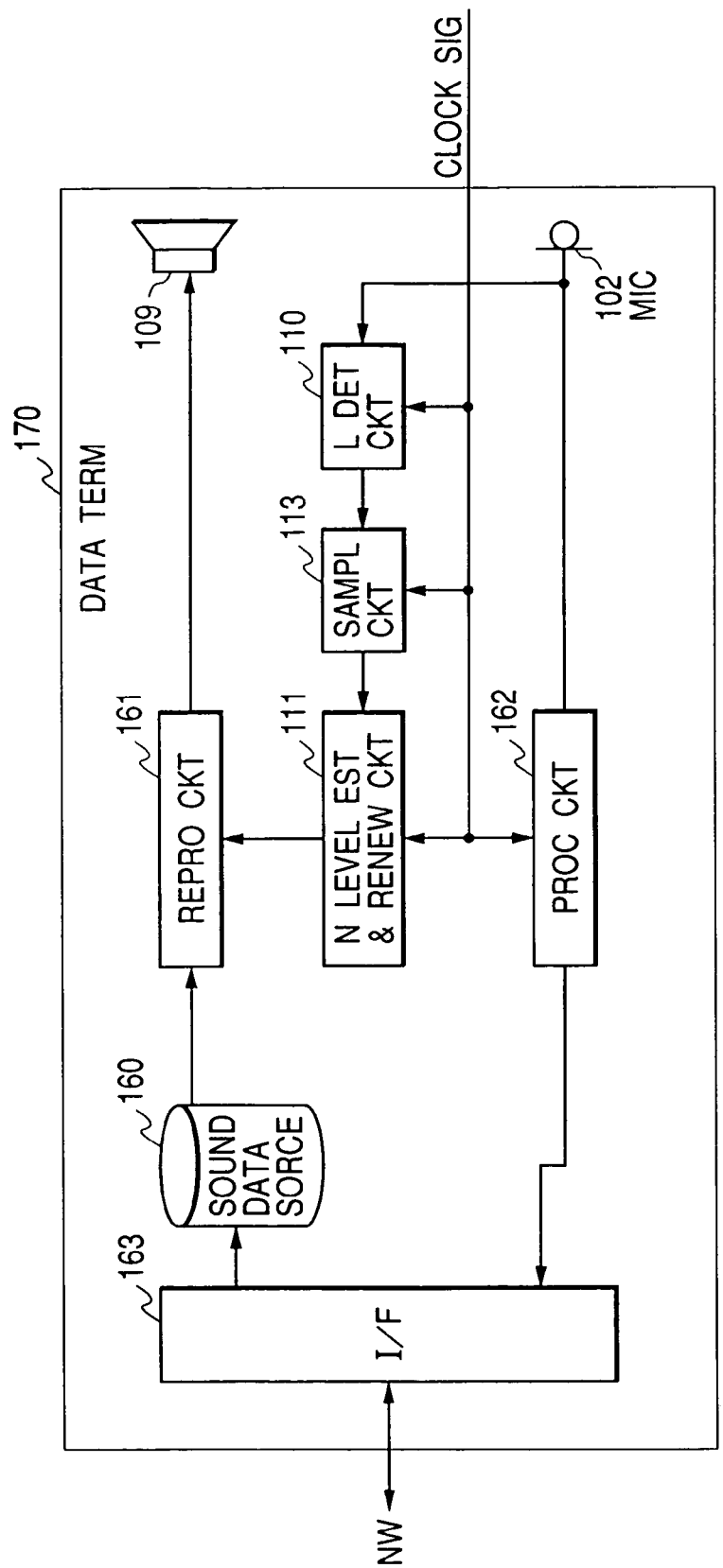
FIG. 7 is a block diagram of a data terminal apparatus of a sixth embodiment including a noise level estimation and renewing function.
Figure 8:
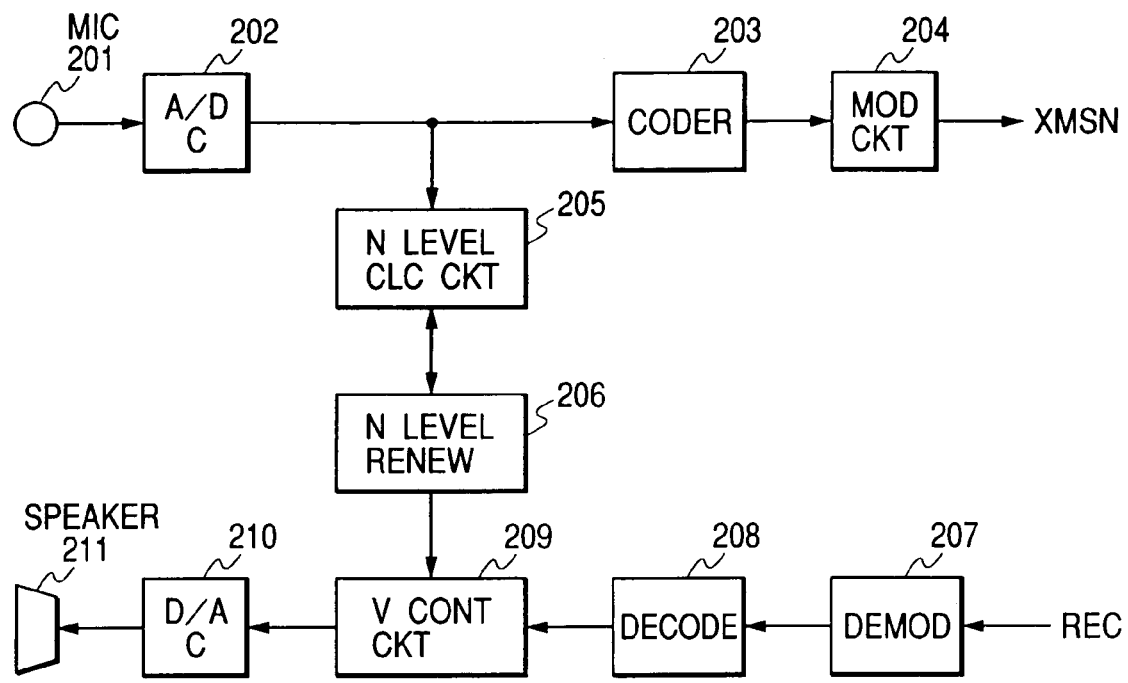
FIG. 8 is a block diagram of this prior art voice communication apparatus.
Figure 9:
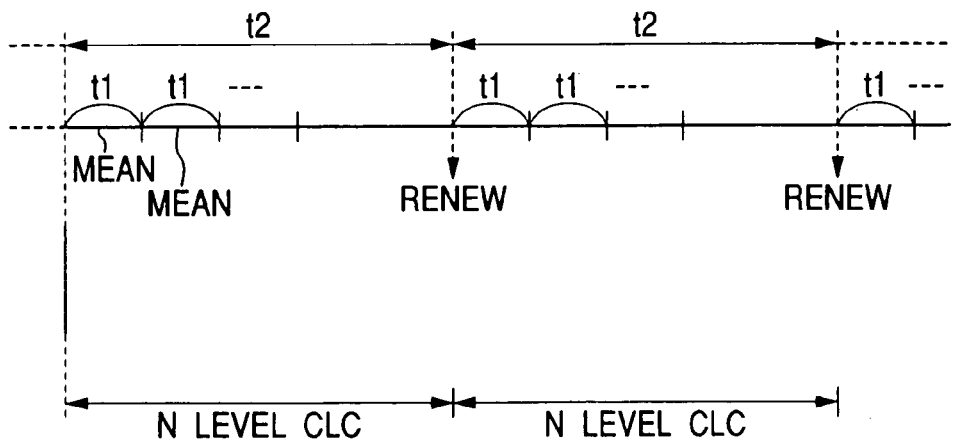
FIG. 9 is a time chart of the prior art.

FIG. 7 is a block diagram of a data terminal apparatus of a sixth embodiment including a noise level estimation and renewing function.

The communication apparatus according to the sixth embodiment has substantially the same structure as that of the first embodiment.

The difference is that the environmental noise level estimation apparatus is applied to a data terminal apparatus 170 such as a personal computer having a sound source 160.

The sound source 160 may comprise a hard disc unit or a CD ROM drive unit, or a DVD drive unit. The sound data in the sound source 160 is read and supplied to a reproducing circuit 161. The reproducing circuit 161 reproduces sound in accordance with the sound data with the speaker 109. The gain of the reproduced sound is controlled in accordance with the estimated environmental noise level from the noise level estimation and renewing circuit 111 as described in the first embodiment.

The sound signal from the microphone 102 may be transmitted through a processing circuit 162 and an interface circuit 163 to a network. The sound data in the sound data source 160 may be written the sound data received from the network through the interface 163. However, the sound data in the sound data source 106 may have been written previously.

In the above-mentioned embodiments, the environmental noise level is detected over the audio frequency range. However, it is also possible to estimate an environmental noise level every frequency range and control the volumes at respective frequency ranges in accordance with respective estimated environmental noise levels.

As mentioned, the interval of sampling is equalized to the interval of the estimating the environmental noise level, so that the frequency of sampling is reduced with respect to the voice interval of the human being, so that an amount of calculation is reduced. On the other hand, the interval of estimating the environmental noise level is shortened with respect to the voice interval of the human being, so that the response to the environmental noise level change can be improved.

What is claimed is:

1. An environmental noise level estimation apparatus comprising:
   detection means for detecting a level of a sound signal including a voice signal and an environmental noise signal;
   sampling means for repeatedly sampling said level in response to a clock signal;
   variation detection means for detecting whether a presently sampled level by the sampling means increases from a previously sampled level thereby, said previously sampled level being sampled one sample before the presently sampled level; and
   estimation means, responsive to said clock signal, for estimating, renewing, and outputting an estimated environmental noise level of said environmental noise signal, when the variation detection means detects that the presently sampled level increases from the previously sampled level, to gradually vary said estimated environmental noise level from a previously estimated environmental noise level by adding a predetermined constant value to the previously estimated environmental noise level.

2. An environmental noise level estimation apparatus as claimed in claim 1, wherein, when said variation detection means detects that the presently sampled level equals to or decreases from the previously sampled level, said estimation means keeps the estimated environmental noise level correspondent to the presently sampled level.

3. An environmental noise level estimation apparatus as claimed in claim 1, wherein said detection means comprises power level detection means for detecting a power of said sound signal and outputs said detected power as said level.

4. An environmental noise level estimation apparatus as claimed in claim 1, further comprising comparing means for comparing said detected level with a predetermined value, wherein said estimation means estimates said environmental noise level only when said detected level is smaller than said predetermined value.

5. An environmental noise level estimation apparatus as claimed in claim 1, wherein an interval of said clock signal is smaller than 250 msec.

6. An environmental noise level estimation apparatus as claimed in claim 5, wherein an interval of said clock signal is smaller than 200 msec.

7. An environmental noise level estimation apparatus as claimed in claim 6, wherein an interval of said clock signal is smaller than 150 msec.

8. An environmental noise level estimation apparatus as claimed in claim 1, further comprises voice presence detection means for detecting the presence of voice signal in accordance with an output of said detection means, wherein said environmental noise level detection means stops said estimation means while said voice presence detection means detects the presence of voice signal.

9. An environmental noise level estimation apparatus as claimed in claim 1, wherein said estimation means renews the previous estimated environmental noise level by adding a predetermined value thereto, and outputs the renewed environmental noise as the estimated environmental noise level.

10. An environmental noise level estimation apparatus comprising:
    detection means for detecting a level of a sound signal including a voice signal and an environment noise signal;
    sampling means for repeatedly sampling said level at a first interval;
    variation detection means, responsive to said sampling means, for detecting whether a presently sampled level by the sampling means increases from a previously sampled level thereby, said previously sampled level being sampled one sample before the presently sampled level; and
    estimation means for estimating and renewing an estimated environmental noise level of said voice signal, when the variation detection means detects that the presently sampled level increases from the previously sampled level, to output the estimated environmental noise level at a second interval so as to gradually vary the estimated environmental noise level from a previously estimated environmental noise level, wherein said first interval agrees with said second interval by adding a predetermined constant value to the previously estimated environmental noise level.

11. A communication apparatus comprising:
    a microphone for receiving sound and generating a sound signal including a voice signal and an environmental noise signal;
    communication means for transmitting said voice signal in a radio wave signal and receiving another voice signal;
    reproducing means for reproducing said voice signal in accordance with said another voice signal;
    detection means for detecting a level of said voice signal;
    sampling means for repeatedly sampling said level in response to a clock signal;
    variation detection means for detecting whether a presently sampled level by the sampling means increases from a previously sampled level thereby, said previously sampled level being sampled one sample before the presently sampled level; and
    estimation means, responsive to said clock signal, for estimating and renewing an estimated environmental noise level of said voice signal, when the variation detection means detects that the presently sampled level increases from the previously sampled level, to output the estimated environmental noise level so as to gradually vary the estimated environmental noise level from a previously estimated environmental noise level by adding a predetermined constant value to the previously estimated environmental noise level; and
    volume control means for controlling a volume of said reproduced voice signal in accordance with said estimated environmental noise level.

12. A communication apparatus as claimed in claim 11, further comprising a codec means for coding voice signal at a predetermined interval to supply said coded voice signal to said communication means as said voice signal and decoding means for decoding said another voice signal at said predetermined interval to supply said decoded another voice signal to said reproducing means as said voice signal, wherein said predetermined interval corresponds to an interval of said clock signal.

13. A communication apparatus as claimed in claim 12, wherein said interval is 10 msec to 40 msec.

14. A communication apparatus as claimed in claim 13, wherein said interval is 15 msec to 25 msec.

15. A communication apparatus as claimed in claim 14, wherein said interval is 20 msec.

16. A data terminal apparatus comprising:
sound source means for supplying sound data;
reproducing means for reproducing reproduced sound in accordance with said sound data;
a microphone for receiving sound including at least an environmental noise and generating a sound signal;
detection means for detecting a level of said sound signal;
sampling means for repeatedly sampling said level in response to a clock signal;
variation detection means for detecting whether a presently sampled level by the sampling means increases from a previously sampled level thereby, said previously sampled level being sampled one sample before the presently sampled level;
estimation means responsive to said clock signal, for estimating and renewing an estimated environmental noise level of said voice signal, when the variation detection means detects that the presently sampled level increases from the previously sampled level, to output the estimated environmental noise level so as to gradually vary the estimated environmental noise level from a previously estimated environmental noise level by adding a predetermined constant value to the previously estimated environmental noise level; and
volume control means for controlling a volume of said reproduced voice signal in accordance with said estimated environmental noise level.

17. A method of estimating an environmental noise level comprising the steps of:
detecting a level of a sound signal including a voice signal and an environmental noise signal;
repeatedly sampling said level in response to a clock signal;
detecting whether a presently sampled level by the sampling means increases from a previously sampled level thereby, said previously sampled level being sampled one sample before the presently sampled level;
estimating and renewing an estimated environmental noise level of said voice signal in response to said clock signal, when the variation detection means detects that the presently sampled level increases from the previously sampled level, to output the estimated environmental noise level so as to gradually vary said estimated environmental noise level from a previously estimated environmental noise level by adding a predetermined constant value to the previously estimated environmental noise level.

18. A method as claimed in claim 17, wherein, when said step of detection detects that the presently sampled level equals to or decreases from the previously sampled level, said step of estimation keeps the estimated environmental noise level correspondent to the presently sampled level.

19. A method as claimed in claim 18, wherein said step of detecting said level of said sound signal comprises the step of detecting a power of said sound signal and outputs said detected power as said level.

20. A method as claimed in claim 18, further comprising the step of:
comparing said detected level with a predetermined value, wherein said environmental noise level is estimated when said detected level is smaller than said predetermined value.

21. A method as claimed in claim 18, wherein an interval of said clock signal is smaller than 250 msec.

22. A method as claimed in claim 21, wherein an interval of said clock signal is smaller than 200 msec.

23. A method as claimed in claim 22, wherein an interval of said clock signal is smaller than 150 msec.

24. A method as claimed in claim 17, wherein said step of estimation renews the previous estimated environmental noise level by adding a predetermined value thereto, and outputs the renewed environmental noise as the estimated environmental noise level.

* * * * *